United States Patent
Buechner et al.

(10) Patent No.: US 8,612,911 B2
(45) Date of Patent: Dec. 17, 2013

(54) ESTIMATING POWER CONSUMPTION OF AN ELECTRONIC CIRCUIT

(75) Inventors: Thomas Buechner, Weil im Schoenbuch (DE); Markus Buehler, Weil im Schoenbuch (DE); Philipp Panitz, Schoenaich (DE); Lei Wang, Hannover (DE); Markus Olbrich, Langenhagen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/365,961

(22) Filed: Feb. 3, 2012

(65) Prior Publication Data

US 2012/0216160 A1    Aug. 23, 2012

(30) Foreign Application Priority Data

Feb. 23, 2011    (EP) ................................ 11155642

(51) Int. Cl.
*G06F 9/455*    (2006.01)
*G06F 17/50*    (2006.01)

(52) U.S. Cl.
USPC ............ 716/109; 716/106; 716/108; 716/113

(58) Field of Classification Search
USPC ....................................... 716/109
See application file for complete search history.

(56) References Cited

U.S. PATENT DOCUMENTS

| | | | |
|---|---|---|---|
| 5,847,966 A * | 12/1998 | Uchino et al. | 716/109 |
| 6,557,151 B1 * | 4/2003 | Donath et al. | 716/108 |
| 2004/0060022 A1 * | 3/2004 | Allen et al. | 716/6 |
| 2012/0216168 A1 | 8/2012 | Buechner et al. | |
| 2012/0266120 A1 | 10/2012 | Buechner et al. | |

FOREIGN PATENT DOCUMENTS

WO    2010004668    1/2010

OTHER PUBLICATIONS

"Dynamic Power Reduction in Flash FPGAs", Actel Mar. 2009, 23 pages.

Agrawal, Vishwani D. et al., "Digital circuit design for minimum transient energy and a linear programming method", VLSI Design, 1999. Proceedings. Twelfth International Conference on Jan. 7-10, 1999, pp. 434-439.

Alexander, Jins D. et al., "Algorithms for Estimating Number of Glitches and Dynamic Power in CMOS Circuits with Delay Variations", 2009 IEEE Computer Society Annual Symposium on VLSI May 13-15, 2009, 6 pages.

(Continued)

*Primary Examiner* — Paul Dinh
*Assistant Examiner* — Bryce Aisaka
(74) *Attorney, Agent, or Firm* — DeLizio Gilliam, PLLC (57) ABSTRACT

A method comprises estimating power consumption of an electronic circuit. The estimating includes assigning a first gate of the at least one gate into a priority queue based on a levelized result of the electronic circuit for a full circuit calculation and assigning a second gate of the at least one gate into the priority queue which fan-out gate is directly connected to a fan-in gate of a resized gate for an incremental circuit calculation. The estimating includes, for each gate from the priority queue, performing the following operations. Latest and earliest signal arrival times at an output net of the gate are determined by static timing analysis and calculating a glitch window as difference, and a transition metric is calculated for the output net based on the glitch window. The operations include determining an upper bound of signal transitions, and estimating the power consumption based on the upper bound.

20 Claims, 5 Drawing Sheets

(56) References Cited

OTHER PUBLICATIONS

Alexander, Jins D. et al., "Computing Bounds on Dynamic Power Using Fast Zero-Delay Logic Simulation", System Theory, 2009. SSST 2009. 41st Southeastern Symposium Mar. 15-17, 2009 , pp. 107-112.

Berkelaar, Michel R. et al., "Gate sizing in MOS digital circuits with linear programming", Design Automation Conference, 1990. EDAC. Proceedings of the European http://ieeexplore.ieee.org/stamp/stamp.jsp?arnumber=136648 (Obtained from the Internet on Dec. 21, 2011) Mar. 12-15, 1990, pp. 217-221.

Ding, Chih-Shun et al., "Gate-level power estimation using tagged probabilistic simulation", Computer-Aided Design of Integrated Circuits and Systems, IEEE Transactions on http://ieeexplore.ieee.org/stamp/stamp.jsp?tp=&arnumber=736184 (Obtained from the Internet on Dec. 21, 2011) Nov. 2009 , pp. 1099-1107.

English, T. et al., "HotSpot : Visualizing Dynamic Power Consumption in RTL Designs", Sep. 20, 2010 , pp. 45-48.

Hu, Fei et al., "Input-specific Dynamic Power Optimization for VLSI Circuits", Low Power Electronics and Design, 2006. ISLPED'06. Proceedings of the 2006 International Symposium on http://ieeexplore.ieee.org/stamp/stamp.jsp?arnumber=4271842 (Obtained from the Internet on Dec. 21, 2011) Oct. 4-6, 2006 , pp. 232-237.

Najm, F. N. et al., "An extension of probabilistic simulation for reliability analysis of CMOS VLSI circuits", vol. 10, Issue 11, Computer-Aided Design of Integrated Circuits and Systems, IEEE Transactions on http://ieeexplore.ieee.org/stamp/stamp.jsp?arnumber=97616 (Obtained from the Internet on Dec. 21, 2011) Nov. 1991 , pp. 1372-1381.

Najm, F. N. , "Low-pass filter for computing the transition density in digital circuits", vol. 13, Issue 9, Computer-Aided Design of Integrated Circuits and Systems, IEEE Transactions on http://ieeexplore.ieee.org/stamp/stamp.jsp? arnumber=310901 (Obtained from the Internet on Dec. 21, 2011) Sep. 1994 , pp. 1123-1131.

Najm, F. N. , "Transition density: a new measure of activity in digital circuits", vol. 12 , Issue 2 Computer-Aided Design of Integrated Circuits and Systems, IEEE Transactions on http://ieeexplore.ieee.org/stamp/stamp.jsp?tp=&arnumber=205010 (Obtained from the Internet on Dec. 21, 2011) Feb. 1993 , pp. 310-323.

Raja, Tezaswi et al., "Minimum dynamic power CMOS circuit design by a reduced constraint set linear program", VLSI Design, 2003. Proceedings. 16th International Conference on http://ieeexplore.ieee.org/stamp/stamp.jsp?arnumber=1183188 (Obtained from the Internet on Dec. 21, 2011) Jan. 4-8, 2003 , pp. 527-532.

Raja, Tezaswi et al., "Variable input delay CMOS logic for low power design", VLSI Design, 2005. 18th International Conference on http://ieeexplore.ieee.org/stamp/stamp.jsp?arnumber=1383340 (Obtained from the Internet on Dec. 21, 2011) Jan. 3-7, 2005, pp. 598-605.

Wang, L. et al., "Fast dynamic power estimation considering glitch filtering", SOC Conference, 2009. SOCC 2009. IEEE International Sep. 9-11, 2009 , pp. 361-364.

Wang, L. et al., "On Glitch Power Reduction", SOC Conference (SOCC), 2011 IEEE International Nov. 21, 2011 , pp. 24-29.

U.S. Appl. No. 13/365,972, filed Feb. 3, 2012, Buechner, Thomas et al.

U.S. Appl. No. 13/365,989, filed Feb. 3, 2012, Buechner, Thomas et al.

"U.S. Appl. No. 13/365,989 Office Action", Feb. 13, 2013, 13 pages.

\* cited by examiner

ESTIMATING POWER CONSUMPTION OF AN ELECTRONIC CIRCUIT

CROSS-REFERENCE TO RELATED APPLICATION

This application claims priority under 35 U.S.C. 119 from European Patent Application No. EP11155642 filed Feb. 23, 2011, the entire contents of which are incorporated herein by reference.

BACKGROUND

Embodiments relate in general to the field of developing integrated electrical circuits, and in particular to a method for estimating power consumption of an electronic circuit, and a system for estimating power consumption of an electronic circuit. Still more particularly, embodiments relate to a data processing program and a computer program product for estimating power consumption of an electronic circuit.

In CMOS technology glitch power dissipated in combinational circuits owns an important portion of the total dynamic power consumption. A State-of-the-Art method for power estimation is called Monte Carlo Simulation (MCS). For this technique, a digital simulator and information about gate and interconnect delays are necessary. The runtime of MCS is high.

Statistical Methods (SM), e.g. IMS-PE, CREST, TPS, are also extensively investigated techniques. SMs are like one-period simulation using a special gate model which requires signal probabilities instead of multi-valued logic. It's faster than Monte Carlo simulation. The nature of SM is like a one-period digital simulation. Therefore, its runtime is still not low enough. In the lack of consideration of correlations the accuracy is also limited. Test cases have shown that especially the estimated power on the nets near the POs may show up to 400% error.

In VLSI design, great attention is paid to the power consumption of circuits. Research covers power estimation and power optimization from system to electrical level. The challenge of lower-level power estimation is to find a reasonable trade-off between computational effort and accuracy of power estimation. For instance, the tools based on SMs can estimate the dynamic power of combinational circuits very efficiently. However, they all suffer more or less from a poor accuracy. Especially, if the dynamic power per net is considered, a satisfying accuracy cannot be reached.

In CMOS circuits, power is dissipated due to the static leakage current and the dynamic current caused by signal transition. During the signal transition a dynamic current flows through the transistor and charges or discharges the parasitic capacitances. The appropriate power is called dynamic power. It can be modeled according to equation (1):

$$P_{dynamic} = \sum_n \frac{1}{2} V_{dd}^2 C_n f_c \alpha_n \quad (1)$$

Wherein $V_{dd}$, $f_c$, $C_n$, and $\alpha_n$ are supply voltage, clock frequency, net capacitance and signal transition rate, respectively. It is obvious that besides scaling down supply voltage and clock frequency, one can also reduce the product of transition rate and net capacitance or either of them to reduce dynamic power.

In combinational circuits, signals are expected to change at most once in one clock period. However, there are almost always unnecessary signal transitions, which are called glitches. If the timing conditions such as setup-time and hold-time of the registers are satisfied, the circuit can still work. However, the signal transition rate an is increased due to the glitches, and therefore more power is consumed by the unnecessary signal transitions. If glitches can be eliminated, dynamic power is reduced. Glitches are caused by different arrival times of signals at the inputs of the gate.

Algorithms were proposed to optimize dynamic power consumption. For full-custom design, power optimization algorithms can result in a glitch-free design. A conventional technique is called path balancing. Besides, hazard filtering is another technique proposed which can be considered as an extension of path balancing. It shows that it is not necessary to balance the signal path exactly to eliminate the glitches. This technique indicates that the gate inertia can stop not only the generation but also the propagation of glitches. According to hazard filtering, a glitch free design needs to satisfy the requirement that the differences of signal arrival times at the inputs of all gates in the circuit must be less than their inertial delays.

Conventional techniques apply a zero-delay model in the simulation to reduce the number of events per period since if normal delay model (non-zero delay model) is applied in the simulation, lots of events could probably be generated in every clock period to model the circuit behavior. In applying the zero-delay model the whole simulation must be shorter, obviously, because the number of events per period is no more than the number of the gates in the circuit. However, the accuracy would be destroyed, if no further method would be employed to take care of the glitches.

SUMMARY

Some example embodiments include a method comprising estimating power consumption of an electronic circuit, wherein the electronic circuit comprises at least one logic cone with at least one gate having a single output. The estimating includes assigning a first gate of the at least one gate into a priority queue based on a levelized result of the electronic circuit for a full circuit calculation. The estimating includes assigning a second gate of the at least one gate into the priority queue which fan-out gate is directly connected to a fan-in gate of a resized gate for an incremental circuit calculation. The estimating includes, for each gate from the priority queue, performing the following operations. The operations include popping the gate from the priority queue. The operations include determining latest and earliest signal arrival times at an output net of the gate under consideration by static timing analysis and calculating a glitch window as difference. The operations include calculating a transition metric for the output net based on the glitch window. The operations include, in response to the gate not being the end of the logic cone being evaluated, pushing its fan-out gates to the priority queue. The operations include determining an upper bound of signal transitions from the calculated transition metric. The operations include estimating the power consumption based on the upper bound.

BRIEF DESCRIPTION OF THE DRAWINGS

Inventive features regarded as the characteristics of the present inventive subject matter are set forth in the Summary of the Inventive subject matter and the appended claims. However, the present inventive subject matter, its implementation mode, other objectives, features and advantages will be better understood through reading the following detailed description of the exemplary embodiments with reference to the accompanying drawings, wherein:

DESCRIPTION OF EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Some example embodiments provide a method for estimating power consumption of an electronic circuit and a system for estimating power consumption of an electronic circuit, which are able to solve the problem of fast and accurate power estimation of integrated circuits and the above mentioned shortcomings and pain points of prior art power estimation of integrated circuits.

Figure 1:
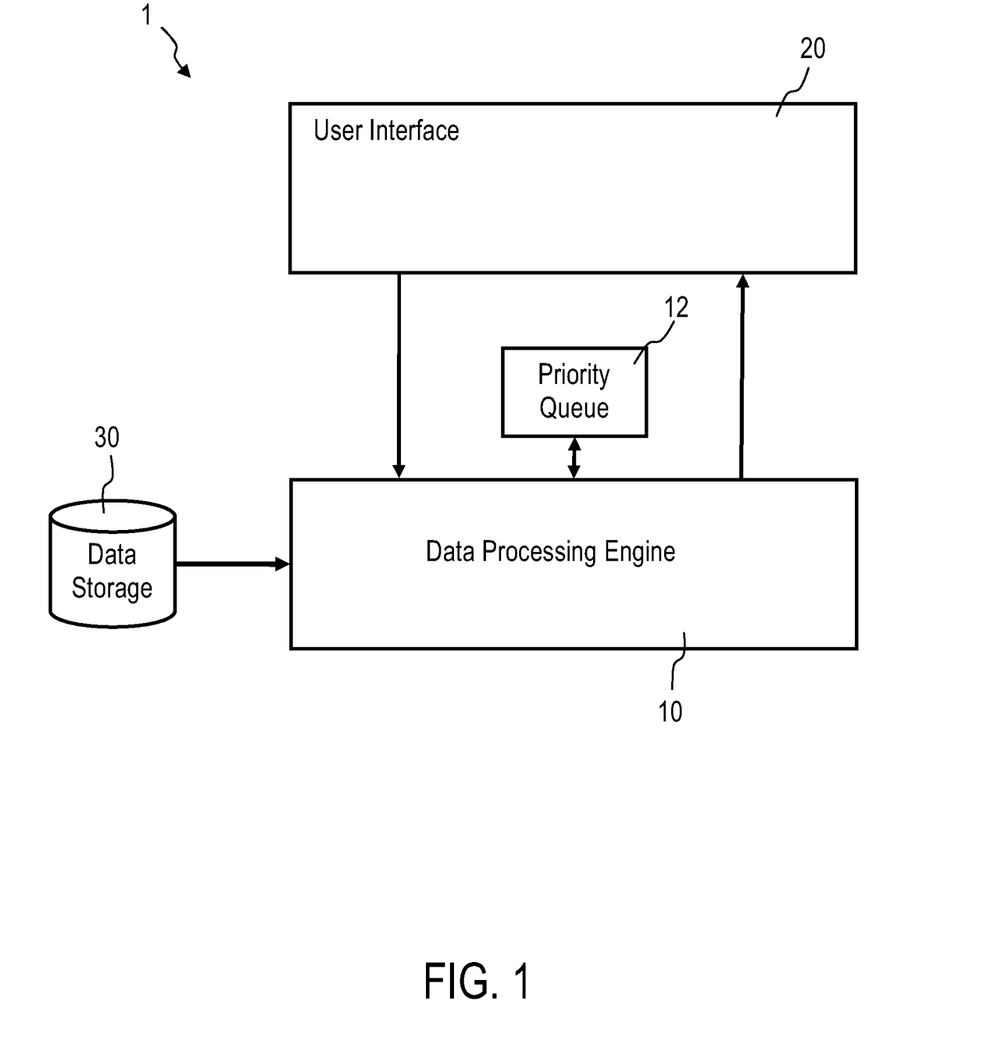
FIG. 1 depicts a schematic block diagram of a system for estimating power consumption of an electronic circuit, according to some example embodiments.
Figure 9:
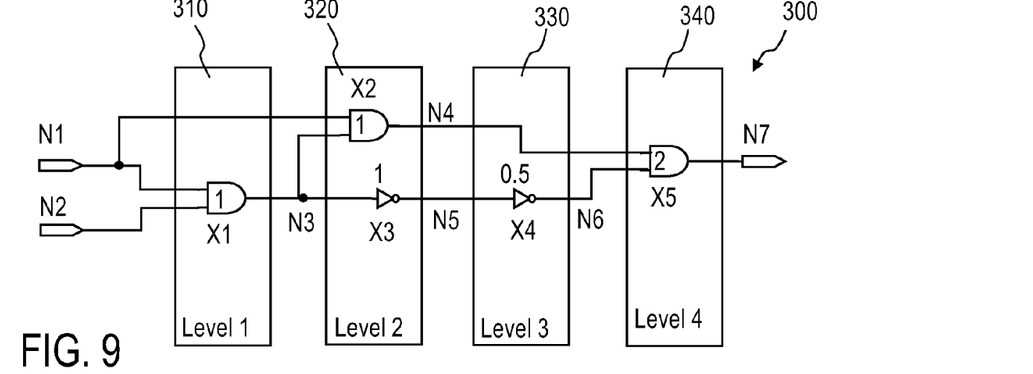
FIG. 9 depicts a circuit diagram of a third embodiment of an electrical circuit to evaluate showing different levels of the electrical circuit, according to some example embodiments.

FIG. 1 shows a system for estimating power consumption of an electronic circuit, according to some example embodiments. FIG. 9 shows an embodiment of an electrical circuit to evaluate comprising exemplary a logic cone 300 and five logic gates X1, X2, X3, X4, X5 showing different levels 310, 320, 330, 340 of the electrical circuit, and FIG. 11 shows the embodiment of the electrical circuit to evaluate of FIG. 9 with a logic cone 300' comprising logic gates X1, X2, X3, X5 and a resized logic gate X4' instead of original logic gate X4.

Referring to FIG. 1 the shown embodiment employs a system 1 for estimating power consumption of an electronic circuit using a gate-level design description. Some example embodiments of such an electronic circuit to evaluate are shown exemplary in FIG. 9 or 11 and comprise at least one cone 300, 300' with at least one gate X1, X2, X3, X4, X4', X5 having a single output net N3, N4, N5, N6, N7 only. The shown system 1 for estimating power consumption of an electronic circuit is represented by a computing environment and comprises a user interface 20 for managing I/O functions of the system 1, a data storage 30 for storing computer usable program code and data, and a data processing engine 10 in electronic communication with the user interface 20 and the data storage 30. According to some example embodiments, the data processing engine 10 assigns at least one gate X1 into a priority queue 12 based on a levelized result of the electronic circuit 300 in case of full circuit calculation. In case of incremental circuit calculation the data processing engine 10 assigns at least one gate X3 into the priority queue 12 which fan-out gate is directly connected to a fan-in gate of a resized gate X4'. For each gate from said priority queue 12 the data processing engine 10 performs following steps: Popping first gate X1, X3 from the priority queue 12, determining latest and earliest signal arrival times LAT, EAT at an output net N3, N5 of the gate X1, X3 under consideration by static timing analysis and calculating a glitch window as difference; calculating a transition metric for the output net N3, N5 based on the glitch window. If the gate X1, X3 is not the end of the logic cone 300, 300' being evaluated pushing its fan-out gates X2, X3; X4' to the priority queue 12; determining an upper bound of signal transitions from the calculated transition metrics; and estimating the power consumption based on the upper bound.

Figure 2:
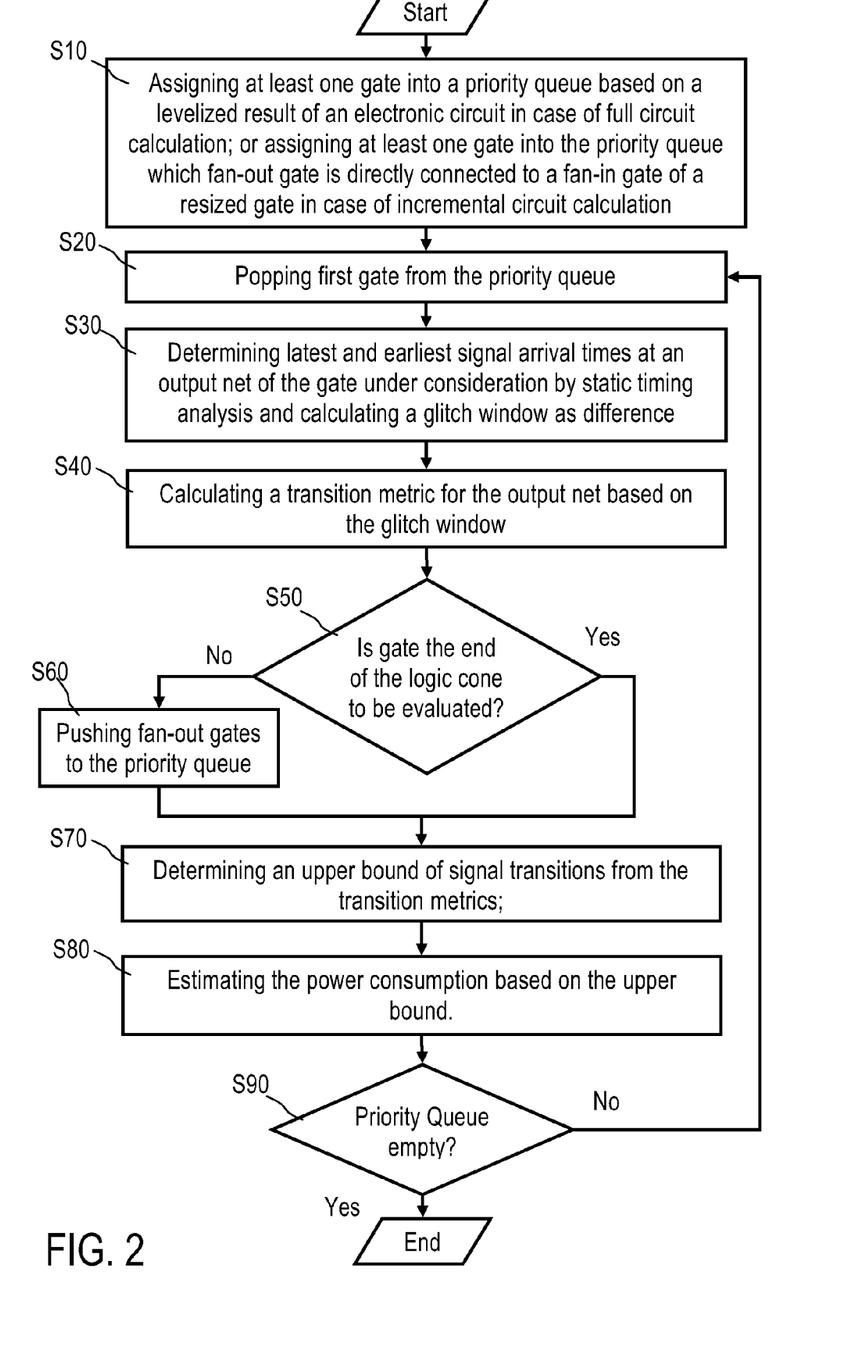
FIG. 2 depicts a schematic flow chart of a method for estimating power consumption of an electronic circuit, according to some example embodiments.

FIG. 2 shows a method for estimating power consumption of an electronic circuit, according to some example embodiments.

Figure 11:
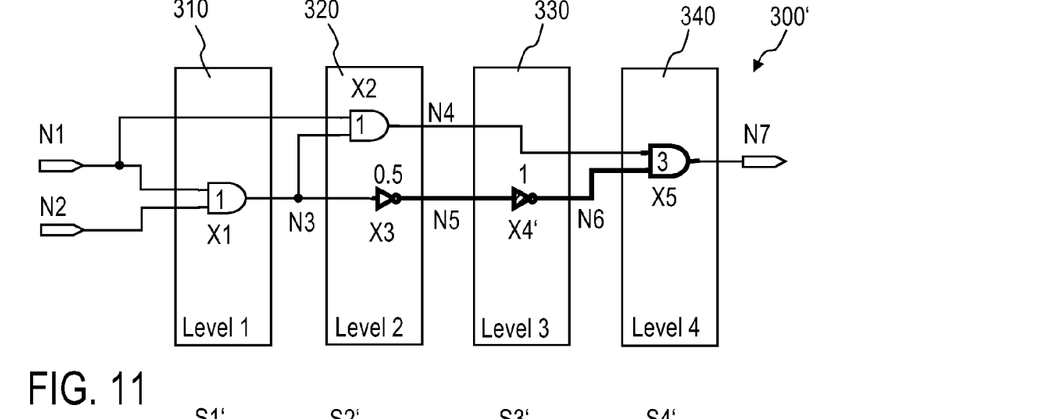
FIG. 11 depicts a circuit diagram of the third embodiment of an electrical circuit to evaluate shown in FIG. 9 with a resized gate, according to some example embodiments.

Referring to FIG. 2 the shown embodiment employs a method for estimating power consumption of an electronic circuit using a gate-level design description, wherein some example embodiments of such an electronic circuit to evaluate are shown in FIG. 9 or 11 and comprise at least one cone 300, 300' with at least one gate X1, X2, X3, X4, X4', X5 having a single output net N3, N4, N5, N6, N7 only. According to some example embodiments, in step S10 at least one gate X1 is assigned into the priority queue 12 based on a levelized result of the electronic circuit in the case of full circuit calculation; or at least one gate X3 which fan-out gate is directly connected to a fan-in gate of a resized gate X4' is assigned into the priority queue 12 in the case of incremental circuit calculation. In step S20 first gate X1, X3 is popped from the priority queue 12 and in step S30 latest and earliest signal arrival times LAT, EAT at an output net N3, N5 of the gate X1, X3 under consideration are determined by static timing analysis and a glitch window is calculated as difference. In step S40 a transition metric for the output net N3, N5 is calculated based on the glitch window. Query S50 checks if the gate X1, X3 under consideration is the end of the logic cone 300, 300' being evaluated. If the gate X1, X3 under consideration is the end of the logic cone 300, 300' being evaluated the method continuous with step S70. If the gate X1, X3 under consideration is not the end of the logic cone 300, 300' being evaluated its fan-out gates X2, X3; X4' are pushed into the priority queue 12 in step S60. In step S70 an upper bound of signal transitions is determined from the calculated transition metrics; and in step S80 the power consumption is estimated based on the upper bound. Query S90 checks if the priority queue 12 is empty. If the priority queue 12 is not empty the method returns to step S20. If the priority queue 12 is empty the method is ended.

Figure 3:
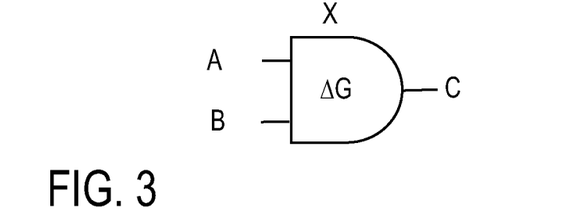
FIG. 3 depicts an equivalent circuit diagram of a logic gate to explain the occurrence of glitches, according to some example embodiments.
Figure 4:
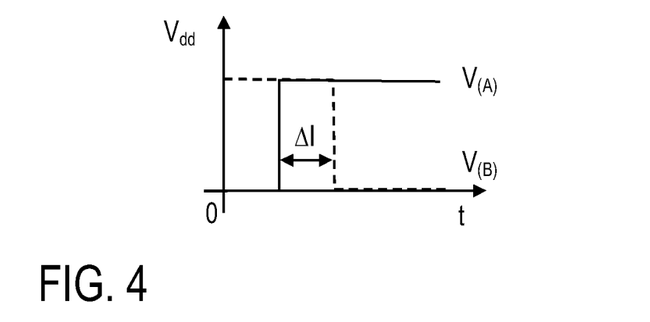
FIGS. 4-6 depict characteristic voltage diagrams at input and output nets of the logic gate of FIG. 3 to explain the occurrence of glitches, according to some example embodiments.
Figure 5:
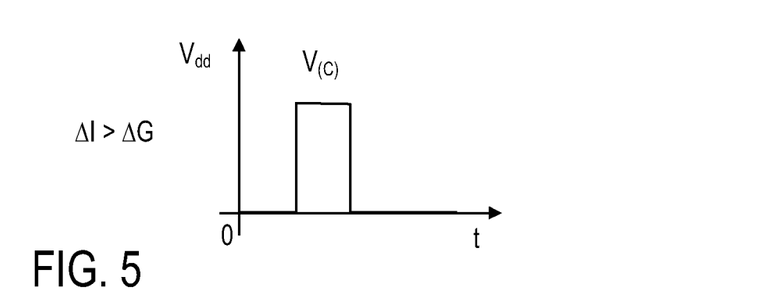
Figure 6:
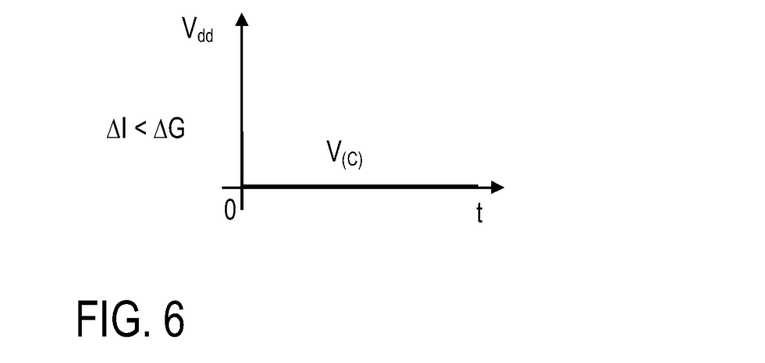

FIG. 3 shows a logic AND-gate X; and FIGS. 4-6 show waveforms at input nets A, B and output net C of the logic AND-gate X to explain the occurrence of glitches.

Referring to FIG. 3 the exemplary logic AND-gate X comprises two input nets A, B and only one output net C and has an inertial delay ΔG. Referring to FIG. 4, $V_{(A)}$ denotes a voltage waveform at input net A, and $V_{(B)}$ denotes a voltage waveform at input net B, wherein $V_{dd}$ denotes a supply voltage of the logic AND-gate X. ΔI denotes an interval between signal transitions at input net A and input net B. Unnecessary signal transition so called glitches occur when difference of input signal delay ΔI is bigger than the inertial delay ΔG of the corresponding logic gate X. FIG. 5 shows the case where the input signal delay ΔI is bigger than the inertial delay ΔG of the corresponding logic gate X and a glitch $V_{(C)}$ occurs at the output net C. FIG. 6 shows the case where the input signal delay ΔI is smaller than the inertial delay ΔG of the corresponding logic gate X and no glitch $V_{(C)}$ occurs at the output net C. Occurring Glitches $V_{(C)}$ may propagate through subsequent logic and the problem is aggravating especially for deep logic cones.

Figure 7:
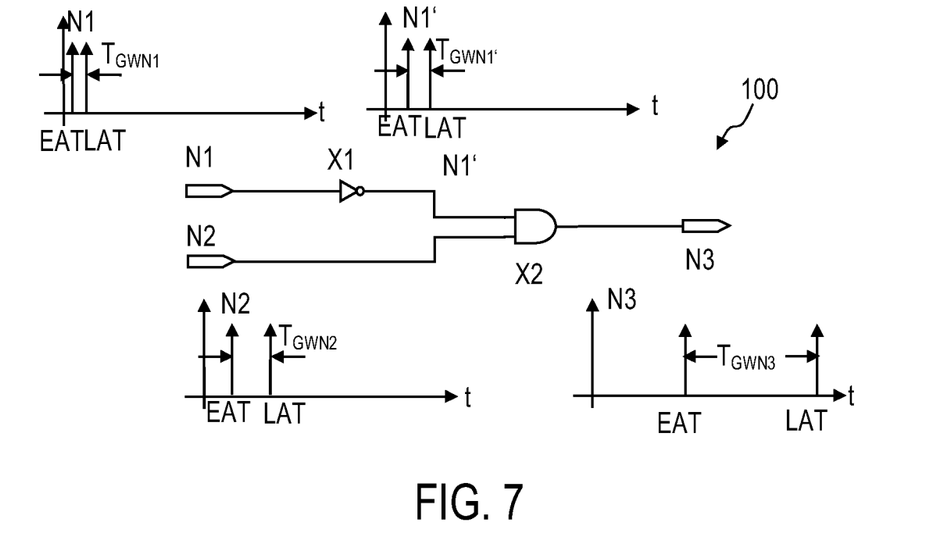
FIG. 7 depicts a circuit diagram of a first embodiment of an electrical circuit to evaluate with corresponding waveform diagrams to explain the definition of a glitch window, according to some example embodiments.

FIG. 7 shows a first embodiment of an electrical circuit to evaluate comprising a logic cone 100 with two primary input nets N1, N2, one output net N3, a first logic gate X1 implemented as inverter and a second logic gate X2 implemented as AND-gate. A first primary input net N1 is also an input net of the first logic gate X1 and an only output net of the first logic gate X1 is denoted as N1', which is also a first input net of the second logic gate X2. A second primary input net N2 is also a second input net of the second logic gate X2, and the only output net of the second logic gate X2 is also the output net N2 of the logic cone 100, because the second logic gate X2 is the end of the logic cone 100. As stated before glitches are caused by the difference of the signal arrival times EAT, LAT at the inputs of a gate X1, X2. A glitch window $T_{GWN1}$, $T_{GWN1'}$, $T_{GWN2}$, $T_{GWN3}$ is defined as a region in which glitches can appear. So the glitch window $T_{GWN1}$, $T_{GWN1'}$, $T_{GWN2}$, $T_{GWN3}$ is the time interval bounded by the earliest and the latest signal arrival time EAT, LAT at a net N1, N1', N2, N3. A first waveform diagram shows a first glitch window $T_{GWN1}$ at the first primary input net N1. A second waveform diagram shows a second glitch window $T_{GWN1'}$ at the output net N1' of the first logic gate X1 which is also the first input net N1' of the second logic gate X2. A third waveform diagram shows a third glitch window $T_{GWN2}$ at the second primary input net N2, and a fourth waveform diagram shows a fourth glitch window $T_{GWN3}$ at the output net N3.

The margins of the glitch windows $T_{GWN1}$, $T_{GWN1'}$, $T_{GWN2}$, $T_{GWN3}$ can be determined by using static timing analysis. However, the glitch windows $T_{GWN1}$, $T_{GWN1'}$, $T_{GWN2}$, $T_{GWN3}$ determined by using delays from static timing analysis can be very pessimistic because the calculation of early-mode and late-mode of static timing analysis picks only the minimal and maximal delays and corresponding transition times which do not represent most practical cases. In the following a method to calculate the delays in the combinational circuits is proposed which is similar to the static timing analysis.

In static timing analysis the gate delay is modeled by a Look-Up-Table (LUT) and the delay calculator uses this LUT and calculates all path-delays summing up the delays and arrival times from inputs to outputs. The minimal and maximal arrival times are selected respectively and the corresponding delays and transition times are recorded and passed to the fan-out gate simultaneously. In this way, the glitch-window is always of maximal width and cannot represent most practical cases. Instead of selecting the minimum and maximum from all path-delays, the delays on the same path are averaged. Then, from the averaged path-delays the minimal and maximal delays and the corresponding averaged transition times are determined and passed to the fan-out gates.

Figure 8:
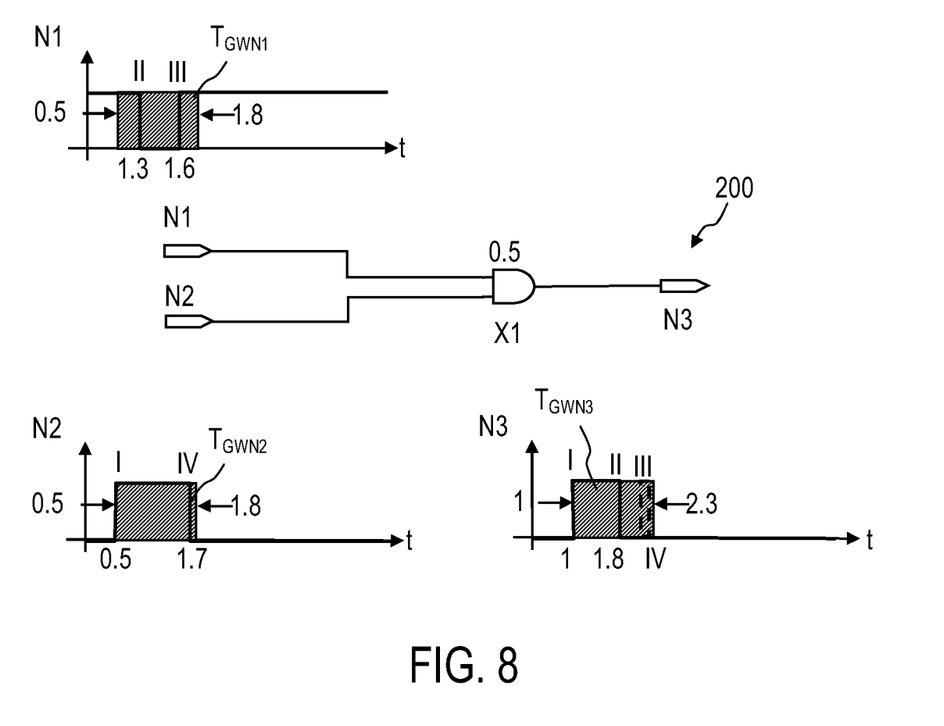
FIG. 8 depicts a circuit diagram of a second embodiment of an electrical circuit to evaluate with corresponding waveform diagrams to explain the definition of a transition metric, according to some example embodiments.

FIG. 8 shows a second embodiment of an electrical circuit to evaluate comprising a logic cone 200 with two primary input nets N1, N2, one output net N3 and a logic gate X1 implemented as AND-gate having an inertial delay ΔG of 0.5. A first primary input net N1 is also a first input net of the logic gate X1 and a second primary input net N2 is also a second input net of the logic gate X1. The only output net of the logic gate X1 is also the output net N2 of the logic cone 200 because the logic gate X1 is also the end of the logic cone 200. As stated before glitches are caused by the difference of the signal arrival times EAT, LAT at the inputs of the logic gate X1. Each glitch window $T_{GWN1}$, $T_{GWN2}$, $T_{GWN3}$ is defined as a region in which glitches can appear. So the glitch window $T_{GWN1}$, $T_{GWN2}$, $T_{GWN3}$ is the time interval bounded by the earliest and the latest signal arrival time EAT, LAT at a net N1, N2, N3 of the logic cone 200. A first waveform diagram shows a first glitch window TGWN1 at the first primary input net N1. A second waveform diagram shows a second glitch window $T_{GWN2}$ at the second primary input net N2, and a third waveform diagram shows a third glitch window $T_{GWN3}$ at the output net N3.

Still referring to FIG. 8 the first glitch window $T_{GWN1}$ starts at 0.5 and ends at 1.8, the second glitch window TGWN2 also starts at 0.5 and ends at 1.8, and the third glitch window $T_{GWN3}$ starts at 1 and ends at 2.3, due to the inertial delay ΔG of 0.5 of the logic gate X1. The accurate number of signal transitions I, II, III, IV depends on the input patterns, the slews of the input signals and the characterization of the logic gates, here the logic gate X1, in the circuit 200. To estimate the accurate number of signal transitions is too expensive to afford by the optimization procedure. Therefore, the calculation is limited to calculation of the transition metric inside of the corresponding glitch window $T_{GWN1}$, $T_{GWN2}$, $T_{GWN3}$.

The glitch window $T_{GWN1}$, $T_{GWN2}$, $T_{GWN3}$ describes the difference of arrival times of the input signals at the corresponding gate X1, wherein a number $N_k$ of signal transitions at the output N3 of the gate X1 cannot exceed an upper bound calculated according to equation (2):

$$N_k = \min\left\{\sum_{i \in \{gate\,inputs\}} N_i, 1 + \left\lfloor \frac{T_{GW}}{d} \right\rfloor\right\} \quad (2)$$

Wherein $N_i$ is the number of signal transitions which might occur at input i, $T_{GW}$ is the glitch-window and d is the inertial delay of the gate X1. This upper bound consists of two terms. The first term indicates that the number of signal transitions at the output N3 cannot exceed the sum of signal transitions occurring at all inputs N1, N2. It is determined by summing the previously calculated bounds at the outputs of fan-in gates. The second term takes the inertial delay of the gate X1 into consideration. The minimum of the second margin is one because the nodes in the combinational circuit are supposed to change at least once in one clock period. In the shown embodiment of the logic cone 200 the upper bound of the number of signal transitions is 3 calculated according to equation (2), wherein at the first input net N1 a first signal transitions occurs at 1.3 and a second signal transition occurs at 1.6, and at the second input net N2 a first signal transitions occurs at 0.5 and a second signal transition occurs at 1.7. So at each input net N1, N2 two signal transitions occur. The third glitch window starts at 1 and ends at 2.3 and the inertial delay of gate X2 is 0.5.

$$N_{N3} = \min\left\{2+2, 1+\left\lfloor\frac{(2.3-1)}{0.5}\right\rfloor\right\} = 3$$

However, inertial delays of the gates are typically not defined in a standard cell library. Instead, an averaged path-delay is used to approximate the inertial delay. In equation (2) the calculated bound is an integer, because the first term is naturally an integer and the fractional part of the second term is truncated. If such a bound is used directly in the optimization, it could occur that the glitch window shrinks, but the value of this bound stays the same. No difference can be told among different gate sizes. Therefore, the truncation operator is omitted and a new quantity is defined. Due to the uncertainty introduced by the averaged path-delays, a transition metric (TM) at the output of a gate is defined according to equation (3):

$$TM_{out} = \min\left\{\sum_{i \in \{gateinputs\}} TM_i, 1 + \frac{T_{GW_{out}}}{d_{ave}}\right\} \quad (3)$$

Wherein $TM_i$ is the transition metric at input i, $T_{GW_{out}}$ is the glitch window and $d_{ave}$ is the averaged path-delay of the corresponding gate. This transition metric represents a modified upper bound of the number of signal transitions at a net.

According to equation (1), dynamic power consumption depends on supply voltage, clock frequency, net capacitance and transition rate. The supply voltage and clock frequency are regarded as constants in this application. Some example embodiments propose a power metric to denote the dynamic power. The power metric (PM) at net n is defined by equation (4):

$$PM_n = TM_n \cdot C_n \quad (4)$$

Wherein TMn and Cn are the transition metric and net capacitance at net n, respectively.

Figure 10:
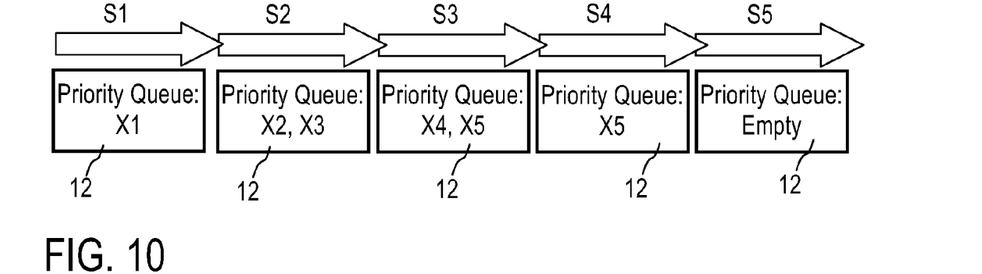
FIG. 10 depicts a diagram showing content of a priority queue of the system for estimating power consumption of an electronic circuit shown in FIG. 1 during execution of a full circuit calculation according to the method for estimating power consumption of an electronic circuit shown in FIG. 2, according to some example embodiments.

FIG. 9 shows a third embodiment of an exemplary electrical circuit to evaluate; and FIG. 10 shows the content of the priority queue 12 during execution of a full circuit calculation.

Referring to FIG. 9 the electrical circuit to evaluate comprises a logic cone 300 with two primary input nets N1, N2, one output net N7 a first logic gate X1 implemented as AND-gate having an inertial delay of 1, a second logic gate X2 implemented as AND-gate having an inertial delay of 1, a third logic gate X3 implemented as inverter having an inertial delay of 1, a fourth logic gate X4 implemented as inverter having an inertial delay of 0.5, and a fifth logic gate X5 implemented as AND-gate having an inertial delay of 2. A first primary input net N1 is also a first input net of the first logic gate X1 and a first input net of the second logic gate X2. A second primary input net N2 is also a second input net of the first logic gate X1, and the only output net of the first logic gate X1 is denoted as N3 and is also a second input net of the second logic gate X2 and an input net of the third logic gate X3. An only output net of the second logic gate X2 is denoted with N4 and is also a first input net of the fifth logic gate X5.

An only output net of the third logic gate X3 is denoted with N5 and is also an input net of the fourth logic gate X4. An only output net of the fourth logic gate X4 is denoted with N6 and is also a second input net of the fifth logic gate X5. The output net N7 of the logic cone 300 is also the output net of the fifth logic gate X5, because the fifth logic gate X5 is also the end of the logic cone 300.

Referring to FIGS. 1, 2, 9 and 10 the full circuit calculation is explained. As shown in FIG. 9 the logic cone 300 of the electrical circuit is levelized in four levels 310, 320, 330, 340. The leveling process of the electronic circuit is performed by sorting the logic gates X, X1, X2, X3, X4, X5 in the electronic circuit in the different levels 310, 320, 330, 340 according to their logic depth. Still referring to FIG. 9, the first logic gate X1 is assigned to a first level 310, the second and third logic gates X2, X3 are assigned to a second level 320, the fourth logic gate X4 is assigned to a third level 330, and the fifth logic gate X5 is assigned to a fourth level 340.

Further a static timing analysis tool is used to determine inertial delay of the logic gates X1, X2, X3, X4, X5, the earliest and the latest signal arrival times EAT, LAT at nets N1, N2, N3, N4, N5, N6, and the capacitance of the nets N1, N2, N3, N4, N5, N6 of the logic gates X1, X2, X3, X4, X5 of the logic cone 300 to be evaluated, wherein an averaged gate delay is used to approximate the inertial delay of the logic gates X1, X2, X3, X4, X5. Table 1 shows the determined results.

TABLE 1

| Net | EAT (ns) | LAT (ns) | Capacity (pF) |
|-----|----------|----------|---------------|
| N1  | 0.0      | 1.0      | 2.0           |
| N2  | 0.0      | 2.0      | 1.0           |
| N3  | 1.0      | 3.0      | 2.0           |
| N4  | 1.0      | 4.0      | 1.0           |
| N5  | 2.0      | 4.0      | 1.0           |
| N6  | 2.5      | 4.5      | 1.0           |
| N7  | 3.0      | 6.5      | 1.0           |

In case of full circuit calculation during a first calculation step S1 the priority queue 12 is initialized with all logic gates of the first level 310 here with the first logic gate X1 connected with primary input nets N1, N2 of the logic cone 300 only, as shown by FIGS. 9 and 10. Further a number of signal transitions at the primary input nets N1, N2 are defined as 1. That means that the transition metrics TMN1, TMN2 at the primary input nets N1, N2 are also defined as 1, as shown in Table 2. The power metrics PMN1, PMN2 at the primary input nets N1, N2 are calculated by using equation (4). The results are also shown in Table 2.

TABLE 2

| Net | TM   | PM   |
|-----|------|------|
| N1  | 1.0  | 2.0  |
| N2  | 1.0  | 1.0  |
| N3  | 2.0  | 4.0  |
| N4  | 3.0  | 3.0  |
| N5  | 2.0  | 2.0  |
| N6  | 2.0  | 2.0  |
| N7  | 2.75 | 2.75 |

During a second calculation step S2 transition metric TMN3 at the output net N3 of the first logic gate X1 of the first level 310 is calculated according to equation (3), based on the transition metrics TMN1, TMN2 at the primary input nets N1, N2. Based on the transition metric TMN3 at the output net N3 of the first logic gate X1 the power metric PMN3 at the output net N3 is calculated according to equation (4). The results are also shown in Table 2. Since the first logic gate X1 is not the end of the logic cone 300 the fan-out gates X2, X3 are pushed to the priority queue 12 during the second calculation step S2.

During a third calculation step S3 transition metric TMN4 at the output net N4 of the second logic gate X2 of the second level 320 and transition metric TMN5 at the output net N5 of the third logic gate X3 of the second level 320 are calculated according to equation (3), based on transition metric TMN1 at the primary input net N1 and transition metric TMN3 at the input net N3 of the second logic gate X2 and the third logic gate X3. Based on the transition metric TMN4 at the output net N4 of the second logic gate X2 the power metric PMN4 at the output net N4 is calculated according to equation (4). Based on the transition metric TMN5 at the output net N5 of the third logic gate X3 the power metric PMN5 at the output net N5 is calculated according to equation (4). The results are also shown in Table 2. Since the second and third logic gates X2, X3 are not the end of the logic cone 300 the fan-out gates X4, X5 are pushed to the priority queue 12 during the third calculation step S3.

During a fourth calculation step S4 transition metric TMN6 at the output net N6 of the fourth logic gate X4 of the third level 330 is calculated according to equation (3), based on the transition metric TMN5 at the input net N5 of the fourth logic gate X4. Based on the transition metric TMN6 at the output net N6 of the fourth logic gate X4 the power metric PMN6 at the output net N6 is calculated according to equation (4). The results are also shown in Table 2. Since the fourth logic gate X4 is not the end of the logic cone 300 the fan-out gate X5 is pushed to the priority queue 12 during the fourth calculation step S4. Since the fan-out gate X5 is already in the priority queue 12 the former input is overwritten.

During a fifth calculation step S5 transition metric TMN7 at the output net N7 of the fifth logic gate X5 of the fourth level 340 is calculated according to equation (3), based on the transition metrics TMN4, TMN6 at the input nets N4, N6 of the fifth logic gate X5. Based on the transition metric TMN7 at the output net N7 of the fifth logic gate X5 the power metric PMN7 at the output net N7 is calculated according to equation (4). The results are also shown in Table 2. Since the fifth logic gate X5 is the end of the logic cone 300 no fan-out gates are pushed to the priority queue 12 during the fifth calculation step S5 and the priority queue 12 is empty and the full circuit calculation is finished. The full circuit calculation results may be written to the data storage 30.

During optimization of the power consumption of the electrical circuit logic gates of the electrical circuit shown in FIG. 9 may be resized.

Figure 12:
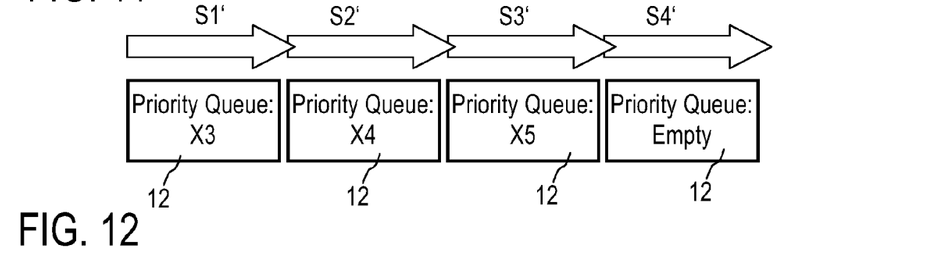
FIG. 12 depicts a diagram showing content of a priority queue of the system for estimating power consumption of an electronic circuit shown in FIG. 1 during execution of an increment circuit calculation according to the method for estimating power consumption of an electronic circuit shown in FIG. 2, according to some example embodiments.

FIG. 11 shows the third embodiment of an electrical circuit to evaluate of FIG. 9 with a resized gate X4'; and FIG. 12 shows the content of the priority queue 12 during execution of an increment circuit calculation.

Referring to FIG. 11 the electrical circuit to evaluate comprises a logic cone 300' with two primary input nets N1, N2, one output net N7 and five logic gates X1, X2, X3, X4', X5. The main difference between the logic cone 300 and the logic cone 300' is the resized fourth logic gate X4'. Because of the resized fourth logic gate X4' the timing and power behavior of the logic cone 300' is different to the logic cone 300, especially the load capacitance of the third logic gate X3 and an input slew of the fifth logic gate X5 are influenced. Still referring to FIG. 11 the first logic gate X1 implemented as AND-gate having an inertial delay of 1 and a second logic gate X2 implemented as AND-gate having an inertial delay of 1 are both unchanged, due to the resized logic gate X4'. The inertial delay of the third logic gate X3 implemented as inverter is changed to 0.5, the inertial delay of the fourth logic gate X4' implemented as inverter is changed to 1.0, and the inertial delay of the fifth logic gate X5 implemented as AND-gate is changed to 3.0 due to the resized fourth logic gate X4'.

Referring to FIGS. 1, 2, 11 and 12 the incremental circuit calculation is explained. As shown in FIG. 11 the logic cone 300' of the electrical circuit is also levelized in four levels 310, 320, 330, 340 and the first logic gate X1 is assigned to the first level 310, the second and third logic gates X2, X3 are assigned to the second level 320, the resized fourth logic gate X4' is assigned to the third level 330, and the fifth logic gate X5 is assigned to the fourth level 340.

Further a static timing analysis tool is used to determine inertial delay of the logic gates X1, X2, X3, X4', X5, the earliest and the latest signal arrival times EAT, LAT at nets N1, N2, N3, N4, N5, N6, and the capacitance of the nets N1, N2, N3, N4, N5, N6 of the logic gates X1, X2, X3, X4, X5 of the logic cone 300' to be evaluated, wherein an averaged gate delay is used to approximate the inertial delay of the logic gates X1, X2, X3, X4', X5. Table 3 shows the determined results. Due to the resized fourth logic gate X4' the earliest arrival time and the latest arrival at nets N5, N6, N7 are changed also changed is the capacitance at net N5.

TABLE 3

| Net | EAT (ns) | LAT (ns) | Capacity (pF) |
| --- | --- | --- | --- |
| N1 | 0.0 | 1.0 | 2.0 |
| N2 | 0.0 | 2.0 | 1.0 |
| N3 | 1.0 | 3.0 | 2.0 |
| N4 | 1.0 | 4.0 | 1.0 |
| N5 | 1.5 | 3.5 | 1.5 |
| N6 | 2.5 | 4.5 | 1.0 |
| N7 | 3.0 | 6.5 | 1.0 |

In case of increment circuit calculation during a first calculation step S1' the priority queue 12 is initialized with at least one logic gate, here the third logic gate X3, which fan-out gate is directly connected to a fan-in gate of the resized gate, here the fourth logic gate X4'. Further, transition metrics TMN1, TMN2, TMN3, TMN4 at the nets N1, N2, N3, N4 not influenced by the resized logic gates, here the fourth logic gate X4', are taken from the results of the full circuit calculation during the first calculation step S1', as shown in Table 4. Also the corresponding power metrics PMN1, PMN2, PMN3, PMN4 are taken from the results of the full circuit calculation during the first calculation step S1', as shown in Table 4.

TABLE 4

| Net | TM | PM |
| --- | --- | --- |
| N1 | 1.0 | 2.0 |
| N2 | 1.0 | 1.0 |
| N3 | 2.0 | 4.0 |
| N4 | 3.0 | 3.0 |
| N5 | 2.0 | 3.0 |
| N6 | 2.0 | 2.0 |
| N7 | 2.167 | 2.167 |

During a second calculation step S2' transition metric TMN5 at the output net N5 of the third logic gate X3 of the second level 320 is recalculated according to equation (3), based on transition metric TMN3 at the input net N3 of the third logic gate X3. Based on the transition metric TMN5 at the output net N5 of the third logic gate X3 the power metric PMN5 at the output net N5 is recalculated according to equation (4). The results are also shown in Table 4. Since the third logic gate X3 is not the end of the logic cone 300' the fan-out gate X4' is pushed to the priority queue 12 during the second calculation step S2'.

During a third calculation step S3' transition metric TMN6 at the output net N6 of the resized fourth logic gate X4' of the third level 330 is recalculated according to equation (3), based on the transition metric TMN5 at the input net N5 of the resized fourth logic gate X4'. Based on the transition metric TMN6 at the output net N6 of the resized fourth logic gate X4' the power metric PMN6 at the output net N6 is recalculated according to equation (4). The results are also shown in Table 4. Since the resized fourth logic gate X4' is not the end of the logic cone 300' the fan-out gate X5 is pushed to the priority queue 12 during the third calculation step S3'.

During a fourth calculation step S4' transition metric TMN7 at the output net N7 of the fifth logic gate X5 of the fourth level 340 is recalculated according to equation (3), based on the transition metrics TMN4, TMN6 at the input nets N4, N6 of the fifth logic gate X5. Based on the transition metric TMN7 at the output net N7 of the fifth logic gate X5 the power metric PMN7 at the output net N7 is recalculated according to equation (4). The results are also shown in Table 4. Since the fifth logic gate X5 is the end of the logic cone 300' no fan-out gates are pushed to the priority queue 12 during the fourth calculation step S4' and the priority queue 12 is empty and the incremented circuit calculation is finished. The incremented circuit calculation results may also be written to the data storage 30.

Compared to the full circuit calculation the incremented circuit calculation may be performed faster, so the runtime during optimization can be further reduced.

Example embodiments for estimating power consumption of an electronic circuit can be implemented as an entirely software embodiment, or an embodiment containing both hardware and software elements. Some example embodiments can be implemented in software, which includes but is not limited to firmware, resident software, microcode, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for movement reduction as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   estimating power consumption of an electronic circuit, wherein the electronic circuit comprises at least one logic cone with a plurality of gates, at least one gate of the plurality of gates having a single output, wherein the estimating comprises,
   assigning, by a processor, a first gate of plurality of gates into a priority queue based on a levelized result of the electronic circuit for a full circuit calculation;
   assigning a second gate of the plurality of gates into the priority queue wherein an output of the second gate is directly connected to an input of a resized gate based on performing an incremental circuit calculation;
   for each gate from the priority queue, performing the following:
     removing the gate from the priority queue;
     determining latest and earliest signal arrival times at an output net of the gate under consideration by static timing analysis and calculating a glitch window as difference;
     calculating a transition metric for the output net based on the glitch window;
     in response to the gate not being the end of the logic cone being evaluated, adding its fan-out gates to the priority queue;
     determining an upper bound of signal transitions from the calculated transition metric; and
     estimating the power consumption based on the upper bound.

2. The method of claim 1, wherein the transition metric of the output net is defined as minimum value between a sum of signal transitions at input nets of the gate under consideration and a component dependent on said glitch window and an inertial delay of the gate under consideration.

3. The method of claim 2, wherein the estimating of power consumption of the electronic circuit comprises performing static timing analysis to determine inertial delay of the plurality of gates of the logic cone to be evaluated.

4. The method of claim 3, wherein an averaged gate delay is used to approximate the inertial delay of the plurality of gates of the logic cone to be evaluated.

5. The method of claim 4, wherein the priority queue is initialized with a gate of the plurality of gates connected with primary input nets of the logic cone for the full circuit calculation, wherein a number of signal transitions at the primary input nets is initialized to a value of one.

6. The method of claim 5, wherein the levelized result of the electronic circuit is derived by sorting gates of the plurality of gates in the electronic circuit in different levels according to their logic depth.

7. The method of claim 6, wherein a gate comprising a level with lowest logic depth is assigned into the priority queue.

8. The method of claim 7, wherein the estimating of power consumption of the electronic circuit comprises determining a power metric of a net dependent on the transition metric and a capacitance of a corresponding net, and using the power metric of the net to estimate an upper bound of the power consumption.

9. A computer program product for estimating power consumption of an electronic circuit, the computer program product comprising:
   a non-transitory computer readable storage medium having computer usable program code embodied therewith, the computer usable program code comprising a computer usable program code configured to:
     assign a first gate of a plurality of gates of the electronic circuit into a priority queue based on a levelized result of the electronic circuit for a full circuit calculation, wherein the electronic circuit comprises at least one logic cone with at least one gate of the plurality of gates having a single output
     assign a second gate of the plurality of gates into the priority queue, the second gate having an output that is directly connected to a fan in gate an input of a resized gate based on performing an incremental circuit calculation;
     for each gate from the priority queue, perform the following:
       remove the gate from the priority queue;
       determine latest and earliest signal arrival times at an output net of the gate under consideration by static timing analysis and calculate a glitch window as difference;
       calculate a transition metric for the output net based on the glitch window;
       in response to the gate not being the end of the logic cone being evaluated, add its fan-out gates to the priority queue;
       determine an upper bound of signal transitions from the calculated transition metric; and
       estimate the power consumption based on the upper bound.

10. The computer program product of claim 9, wherein the transition metric of the output net is defined as minimum value between a sum of signal transitions at input nets of the gate under consideration and a component dependent on said glitch window and an inertial delay of the gate under consideration.

11. The computer program product of claim 10, wherein the estimating of power consumption of the electronic circuit comprises performing static timing analysis to determine inertial delay of the plurality of gates of the logic cone to be evaluated.

12. The computer program product of claim 11, wherein an averaged gate delay is used to approximate the inertial delay of the plurality of gates of the logic cone to be evaluated.

13. The computer program product of claim 12, wherein the priority queue is initialized with a gate of the plurality of gates connected with primary input nets of the logic cone for the full circuit calculation, wherein a number of signal transitions at the primary input nets is initialized to a value of one.

14. The computer program product of claim 13, wherein the levelized result of the electronic circuit is derived by sorting gates of the plurality of gates in the electronic circuit in different levels according to their logic depth.

15. The computer program product of claim 14, wherein a gate comprising a level with lowest logic depth is assigned into the priority queue.

16. The computer program product of claim 15, wherein the estimating of power consumption of the electronic circuit comprises determining a power metric of a net dependent on the transition metric and a capacitance of a corresponding net, and using the power metric of the net to estimate an upper bound of the power consumption.

17. An apparatus comprising:
a processor;
a data processing engine executable on the processor, the data processing engine configured to,
estimate power consumption of an electronic circuit, wherein the electronic circuit comprises at least one logic cone with a plurality of gates, at least one gate of the plurality of gates having a single output, wherein the estimate comprises,
assign a first gate of the plurality of gates into a priority queue based on a levelized result of the electronic circuit for a full circuit calculation;
assign a second gate of the plurality of gates into the priority queue wherein an output of the second gate is directly connected to an input of a resized gate based on performing an incremental circuit calculation;
for each gate from the priority queue, perform the following:
remove the gate from the priority queue;
determine latest and earliest signal arrival times at an output net of the gate under consideration by static timing analysis and calculate a glitch window as difference;
calculate a transition metric for the output net based on the glitch window;
in response to the gate not being the end of the logic cone being evaluated, add its fan-out gates to the priority queue;
determine an upper bound of signal transitions from the calculated transition metric; and
estimate the power consumption based on the upper bound.

18. The apparatus of claim 17, wherein the transition metric of the output net is defined as minimum value between a sum of signal transitions at input nets of the gate under consideration and a component dependent on said glitch window and an inertial delay of the gate under consideration.

19. The method of claim 18, wherein the estimate of power consumption of the electronic circuit comprises an operation to perform static timing analysis to determine inertial delay of the plurality of gates of the logic cone to be evaluated.

20. The method of claim 19, wherein an averaged gate delay is used to approximate the inertial delay of the plurality of gates of the logic cone to be evaluated.

* * * * *